United States Patent [19]

Savino

[11] Patent Number: 4,843,372

[45] Date of Patent: Jun. 27, 1989

[54] BRIDGE SWAY AND DEFLECTION DETECTION SYSTEM

[76] Inventor: Thomas Savino, 57 Chestnut St., Westbury, N.Y. 11590

[21] Appl. No.: 146,563

[22] Filed: Jan. 21, 1988

[51] Int. Cl.⁴ ............................................. G08B 21/00
[52] U.S. Cl. ..................................... 340/540; 73/786; 340/533; 340/686; 356/400
[58] Field of Search ........................ 340/540, 686, 533; 356/400, 399, 373; 73/786; 33/263, 286, DIG. 21

[56] References Cited

U.S. PATENT DOCUMENTS

| | | | |
|---|---|---|---|
| 3,744,043 | 7/1973 | Walden et al. | 340/533 |
| 3,939,460 | 2/1976 | Horn et al. | 340/533 |
| 4,288,158 | 9/1981 | Früngel | 340/689 |
| 4,296,485 | 10/1981 | Clemens | 340/689 |
| 4,472,883 | 9/1984 | Ortega | 33/462 |
| 4,730,928 | 3/1988 | Gabriel et al. | 356/400 |

Primary Examiner—Glen R. Swann, III
Attorney, Agent, or Firm—Richard L. Miller

[57] ABSTRACT

Apertured plates are mounted to a bridge structure and cooperate with a mirror system to reflect a laser beam from a laser gun to a laser receiver that is coupled to processing circuitry coupled to a modem that is in turn coupled to a central monitoring station through a telephone line. There are a first pair of aperture plates fixedly secured to one side of a first vertical column and a second vertical column of the bridge and are aligned with each other and a first mirror of the mirror system. A second pair of aperture plates are fixedly secured to another side of the first vertical column and the second vertical column of the bridge and are aligned with each other and a second mirror of the mirror system in order to provide for a forward and reverse passage of the laser beam for detecting the sway and deflection of the bridge.

4 Claims, 1 Drawing Sheet

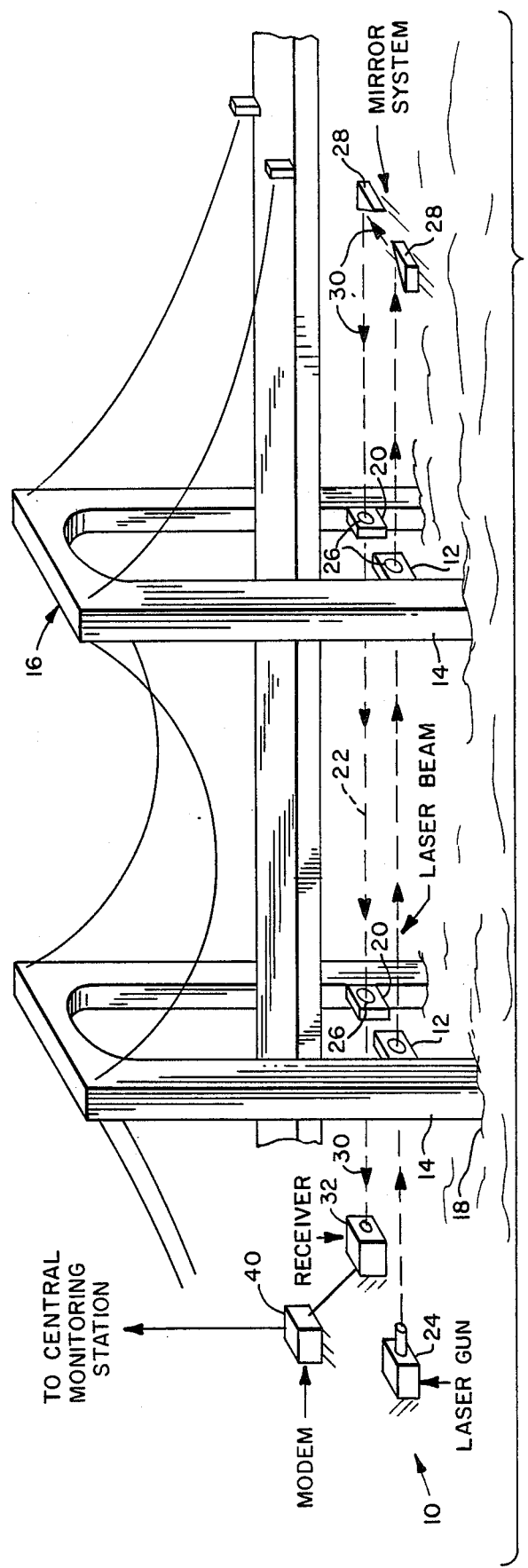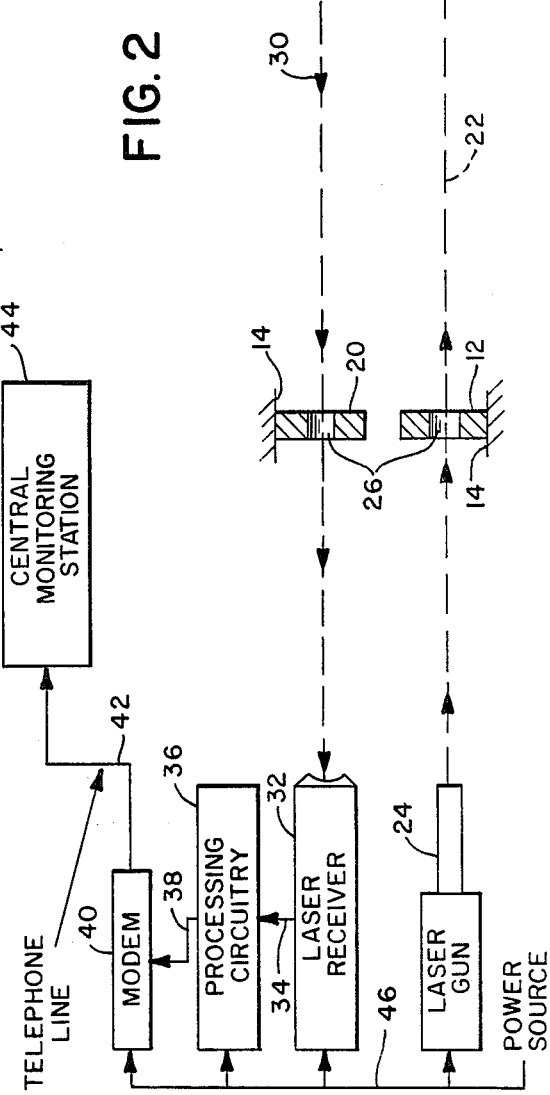

BRIDGE SWAY AND DEFLECTION DETECTION SYSTEM

BACKGROUND OF THE INVENTION

The instant invention relates generally to motion detection systems, and more particularly, to a bridge sway and deflection detection system.

Numerous electronic detection systems have been provided in the prior art that are adapted to detect motion. For example, U.S. Pats. Nos. 4,472,883 of Ortega; 4,296,485 of Clemens and 4,288,158 of Frungel, all are illustrative of such prior art. While these units may be suitable for the particular purpose to which they address, they would not be as suitable for the purpose of the present invention as hereafter described.

SUMMARY OF THE INVENTION

A primary object of the present invention is to provide a bridge sway and deflection detection system that will overcome the shortcomings of the prior art devices.

Another object is to provide bridge sway and deflection detection system that will employ the use of a laser beam to detect motion that it dangerous in a bridge structure.

An additional object is to provide a bridge sway and deflection detection system, which will be so designed, as to send signals to a central monitoring station, when a dangerous motion of a bridge is detected, so as to avoid a catastrophe.

A further object is to provide a bridge sway and deflection detection system that is simple and easy to use.

A still further object is to provide a bridge sway and deflection detection system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a fragmentary perspective view of a typical bridge with the instant invention installed thereon; and FIG. 2 is a schematic block diagram of the instant invention per se.

DETAILED DESCRIPTION OF THE PREFERRED EMBODIMENTS

Turning now descriptively to the drawings, in which like reference characters denote like elements throughout the several views, a system 10 includes a pair of spaced plates 12 mounted fixedly to a pair of vertical columns 14 of a bridge 16. Plates 12 are spaced above the water 18, and a second pair of plates 20 align with the plates 12 and are mounted fixedly to the opposite sides of columns 14, for passage of a laser beam 22 from laser gun 24 which passes through apertures 26 provided through plates 12. A pair of mirrors 28 are provided and are mounted fixedly to a structure of bridge 16, in a manner (not shown), for reflecting the beam 22 to the opposite side of the bridge 16, as shown by arrows 30, so as to enter the laser receiver 32.

The design of system 10 is such that the laser receiver 32 is coupled by cable 34 to processing circuitry 36 that is coupled by cable 38 to a modem 40, and the output of modem 40 is coupled by telephone cable 42 to a central monitoring station 44, where visual readout and alarms are actuated in the event that a blockage occurs to obstruct the path of laser beam 22. Power cable 46 couples to a power source and supplies electrical power to 24, 32, 36 and 40 for the continuous operation of system 10.

Blockage may occur if any one aperture 26 of the plates 12 and 20 becomes disaligned and causes the laser beam 22 from the laser gun 24 to strike either of the plates 12 and 20 instead of passing through apertures 26 thereof to be reflected back to the laser receiver 32.

In operation, laser gun 24 emits laser beam 22 that under normal conditions will beam through the apertures 26 of plates 12 first. This beam then strikes a first mirror 28 in its path and is reflected to the second mirror 28 where it reflects reversely back through the apertures 26 of the second pair of plates 20 and is picked up by the laser receiver 32 where it is fed into the processing circuitry 36. This data is fed to the modem 40 and into the telephone line 42 connected to the central monitoring station 44.

Lateral sway along the longitudinal axis, vertical mis-alignment of either of the columns 14, lowering of one side of a column 14, and total washout or other destruction of bridge 16, is immediately transmitted into the central monitoring station 44, because the path of laser beam 22 will be blocked from returning to the laser receiver 32.

It is to be distinctly understood that, while the text and drawings illustrate that a laser is to be employed to produce a detectable energy beam, that other embodiments of the same invention can use a light beam, a microwave beam, a radio frequency beam, or possibly some other detectable energy source without departing from the spirit of the invention.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A bridge sway and deflection detection system, comprising, a first pair of aperture plates and a second pair of aperture plates mounted to a bridge, for passage of a laser beam emitted by a laser gun, mirror system means provided for cooperation with said laser beam in reflecting said laser beam to a laser receiver of said system, and processing circuitry and a modem coupled in said system, for feeding data by telephone line means to a central monitoring station, for visual read-out and actuation of alarm mean in said central monitoring station, wherein said first pair of aperture plates are fixedly secured to one side of a first vertical column and a second vertical column of said bridge and are aligned with each other and a first mirror of said mirror system means, and said second pair of aperture plates are fixedly secured to another side of said first vertical column and said second vertical column of said bridge and are aligned with each other and a second mirror of said mirror system means, providing for forward and reverse passage of said laser beam for detection means.

2. A bridge sway and deflection detection system as set forth in claim 1, wherein said laser gun is spaced from said first vertical column that is disposed at one end of said bridge and emits said laser beam through said first pair of aperture plates in one direction, and said beam strikes said first mirror that is spaced from said second vertical column at another end of said bridge, and said beam reflects onto said second mirror which is adjacent, causing said beam to deviate in direction wherein said beam passes through said second pair of aperture plates in reversed direction and is received in said laser receiver that is spaced from and adjacent said laser gun.

3. A bridge sway and deflection detection system as set forth in claim 2, wherein said first mirror and said second mirror includes angled mirror surfaces that bounce said beam at right angles and causes aid beam to reverse in direction and travel to said laser receiver, and said beam normally passes through said first aperture plates and then through said second aperture plates by reflection means from said mirror system means.

4. A bridge sway and deflection detection system as set forth in claim 3, wherein said laser receiver is coupled at an output by cable means to an input of said processing circuit that delivers signals into an input of said modem when said bridge is in normal condition and when stress occurs in said bridge, one or more of said aperture plates will dis-align, causing said beam not to reflect in reverse back to said laser receiver, indicating an alarm condition.

* * * * *